United States Patent [19]

Negoro

[11] Patent Number: 4,585,308
[45] Date of Patent: Apr. 29, 1986

[54] LENS FRAME HOLDING DEVICE
[75] Inventor: Ikuo Negoro, Tokyo, Japan
[73] Assignee: Asahi Kogaku Kogyo Kabushiki Kaisha, Tokyo, Japan
[21] Appl. No.: 641,907
[22] Filed: Aug. 20, 1984
[30] Foreign Application Priority Data
 Sep. 7, 1983 [JP] Japan .................... 58-164358
[51] Int. Cl.$^4$ .................... G02B 27/02; G03B 25/52
[52] U.S. Cl. .................... 350/252; 355/55
[58] Field of Search .................... 350/251, 252, 257, 528; 355/55, 67

[56] References Cited

U.S. PATENT DOCUMENTS

| | | | |
|---|---|---|---|
| 2,377,718 | 6/1945 | Ress | 350/252 |
| 2,718,815 | 9/1955 | Manning | 350/251 |
| 4,319,836 | 3/1982 | Murata et al. | 350/252 |

*Primary Examiner*—John K. Corbin
*Assistant Examiner*—William Propp
*Attorney, Agent, or Firm*—Sughrue, Mion, Zinn, Macpeak, and Seas

[57] ABSTRACT

A lens frame holding device for mounting the optical unit of a copying machine in which the position of the lens frame in the direction of the optical axis is regulated so that, if a lens frame is removed from the housing for maintenance or the like, it can be easily and accurately reassembled without the need for adjustment. A housing has bottom and vertical walls at opposite ends of the bottom wall, and supporting cuts are formed in the vertical walls for supporting the lens frame. Two hooking slots are formed in each vertical wall, and elastic lens holding members are provided for securing the lens frame to the housing. The lens holding members each having two hooking portions adapted to engage with the hooking slots. With the lens holding members laid over the lens frame set in the supporting cuts, the lens frame is fixedly secured to the housing using the hooking portions and hooking slots.

7 Claims, 13 Drawing Figures

LENS FRAME HOLDING DEVICE

BACKGROUND OF THE INVENTION

The present invention relates to a lens frame holding device for an optical unit such as may be used in a copying machine.

In general, devices of this type includes, as shown in FIGS. 1 and 2, a cylindrical lens frame 12 holding a lens 11 and fixedly mounted on a housing 13. The housing 13 has two vertical walls 14 which are arranged perpendicular to the optical axis of the lens 11, and a bottom wall 15 connecting the vertical walls 14. Thus, the housing 13 is substantially U shaped in section. Cuts 16 for receiving and supporting the lens frame 12 are formed in the vertical walls 14 opening upwardly. A hook 17 and a threaded hole 18 provided on opposite sides of the middle portion of the bottom wall 15 hold a tying band 20. The tying band 20 has a hook receiving hole 21 at one end into which the hook 17 is inserted, and an attachment part 22 at the other end which has a throughhole. After the hole 21 is engaged with the hook 17, the attachment part 22 is fixedly secured to the housing 13 with a screw 23 to thus fixedly support the lens frame 12 on the housing. The housing 13 has a guide bar 19 for moving the housing 13 and accordingly the lens frame 12.

The above-described conventional lens frame holding device suffers from difficulties in that the middle portion of the lens frame 12, as viewed in the direction of the optical axis, is pushed downwardly by the typing band 20, while both end portions are pushed upwardly by the vertical walls 14. Therefore, if the force of tightening the typing band is excessive, the lens frame 12 will be bent, and accordingly the lens 11 inclined in the lens frame 12. In order to eliminate this difficulty, it is necessary to increase the accuracy of the components, with the result that the manufacturing cost becomes high. Furthermore, as the assembly process of the device includes a step of tightening the tying band with the screw 23, the assembling efficiency is relatively low. The position of the lens frame 12 on the housing 13 is regulated by the supporting cuts 16. However, no means for regulating the position of the lens frame in the direction of the optical axis is provided. Therefore, if the lens frame 12 is removed from the housing, for instance, for maintenance, then it is difficult to accurately reassemble the lens frame at the original position.

SUMMARY OF THE INVENTION

In view of the above-described difficulties accompanying a conventional lens frame holding device, the invention provides a lens frame holding device in which, according to the invention, for each lens holding member, two hooking slots are formed in each of the vertical walls having the lens frame supporting cuts, and the lens holding members, which are elastic members, have hooking member engaged with the hooking slots. With the lens holding member laid over the lens frame set in the supporting cuts of the vertical walls, the lens frame is secured to the holding using the hooking members and the hooking slots. The position of the lens frame on the housing in the direction of the optical axis can be determined by providing a lens frame positioning device which moves the lens frame with respect to the housing in the direction of the optical axis.

DESCRIPTION OF THE PREFERRED EMBODIMENTS

The invention will now be described with reference to preferred embodiments.

Figure 1:
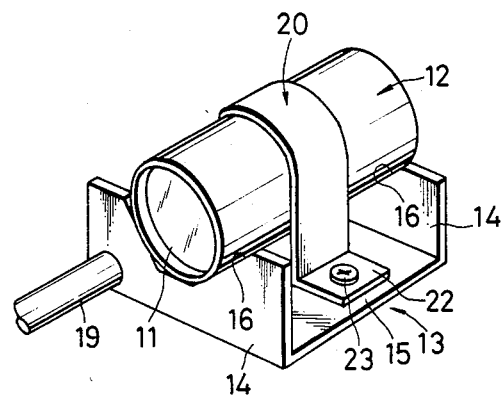
FIG. 1 is a perspective view showing an example of a conventional lens frame holding device.
Figure 2:
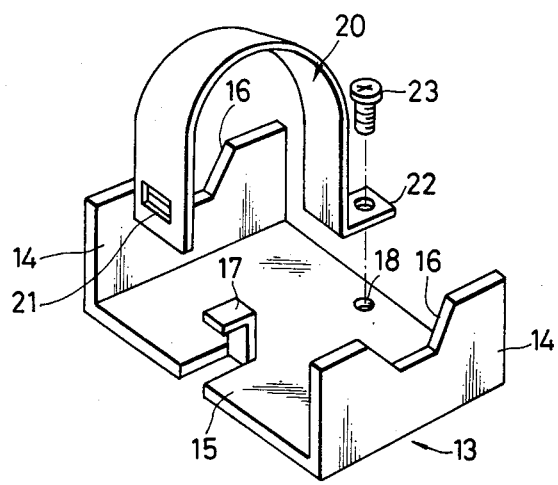
FIG. 2 is an exploded perspective view showing the device from which a lens frame has been removed.
Figure 3A:
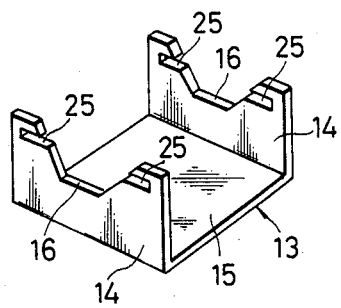
FIGS. 3A through 5C show examples of a lens frame holding device according to this invention, of which figures designated with A are perspective views of a housing, with B, perspective views of a lens holding member, and with C, also perspective views of a lens frame fixedly mounted on the housing.
Figure 3B:
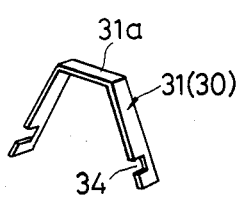
Figure 3C:
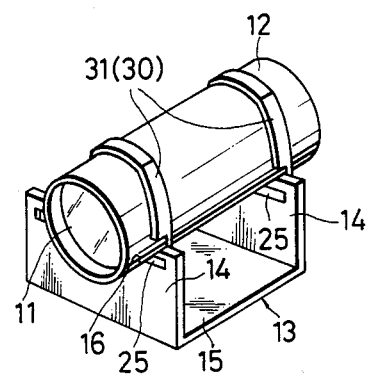
Figure 4A:
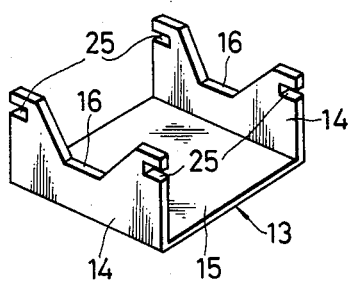
Figure 4B:
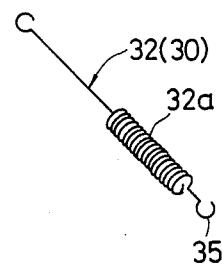
Figure 4C:
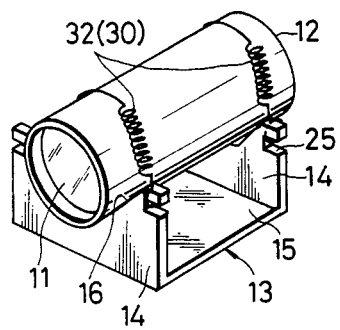
Figure 5A:
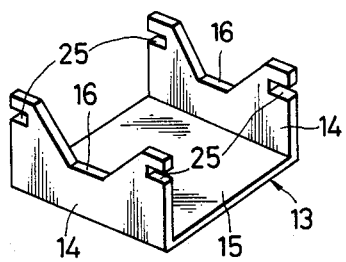
Figure 5B:
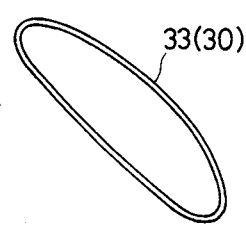
Figure 5C:
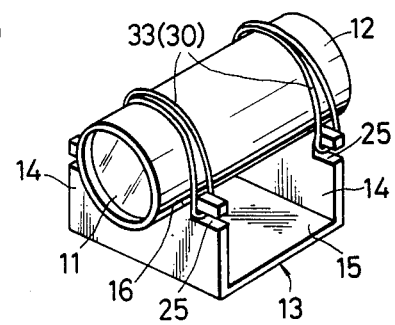

FIGS. 3A through 5C shows first, second and third examples of a lens holding device according to the invention. In these figures, components corresponding to those of the conventional device in FIGS. 1 and 2 are designated by the same reference numerals. In the first, second and third examples in FIGS. 3A to 5C, the housing 13 is similar in fundamental configuration to that of the conventional device. Two hooking slots 25 are formed in both sides of each of the supporting cuts 16 which are formed in the two vertical walls 14. The hooking slots 25 are engaged with lens holding members 30. More specifically, the hooking slots 25 can be horizontal grooves which are formed in each vertical wall from inside the supporting cuts 16 (FIGS. 3A to 3C) or from outside the supporting cuts (FIGS. 4A through 5C). Thus, each housing 13 has four hooking slots located at respective ones of the four corners of the housing.

The first, second and third examples in FIGS. 3A through 5C differ from one another in the lens holding members 30, which are elastic members. In the first example of FIGS. 3A to 3C, the lens holding members 30 are leaf springs 31. In the second example of FIGS. 4A to 4C, the lens holding members 30 are tensioned coil springs 32. In the third example of FIGS. 5A to 5C, the lens holding members 30 are rubber rings 33. Each leaf spring 31 has a substantially U shape with the legs open when set free. Hooking grooves 34 are formed in the lower end portions of the legs of the leaf spring 31. The two grooves 34 thus cut are engaged with the hooking slots 25. Each tension coil spring 32 has hooks 35 at both ends. In the case of the rubber ring 33, any point thereof can be used for engagement with the hooking slot.

In the above-described examples of the device, the lens frame 12 can be fixedly mounted on the housing 13 as follows: First, the lens frame 12 is inserted in the supporting cuts 16 of the housing 13 and set in place, and the lens holding members 30 (the leaf springs 31, the tension coil springs 32, or the rubber rings 33) are laid over the lens frame 12. Under this condition, the grooves 34 are engaged with the hooking slots 25 of the vertical walls 14. In the second example of FIGS. 4A to 4C, the hooks 35 are engaged with the hooking slots 25. In the third example of FIGS. 5A to 5C, the rubber rings 33 are engaged with the hooking slots 25. In each of the above-described examples, the lower halves of two end portions of the lens frame 12 are supported by the supporting cuts 16 of the vertical walls 14, while the upper halves are supported by the lens holding members 30. In each device, unlike the conventional device, no bending moment is applied to the lens frame 12, and accordingly the lens will not be inclined in the lens frame. Thus, the lens performance is maintained unchanged.

In the above-described examples, the force of fixedly holding the lens frame can be changed by selecting the material and dimensions of the lens holding member 30. In addition, the same effect can be obtained by, in the first example in FIGS. 3A to 3C, adjusting the degree of linearity of the upper portion 31a of the leaf spring 31 when set free, and by adjusting the length of the coil of the tension coil spring 32 in the second example in FIGS. 4A to 4C. In the second example using the tension coil springs 32, the coils 32a thereof may be positioned selectively, for instance, on one side or both sides of the lens frame 12, so that the tension coil springs will not interfere with other mechanical elements arranged near the lens frame 12.

Figure 6:
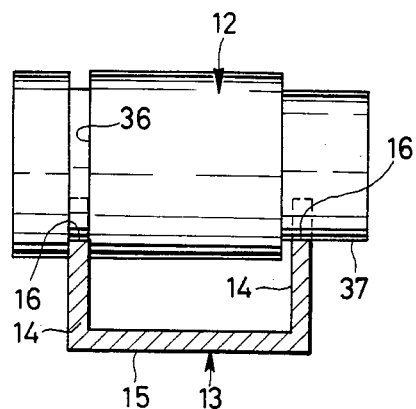
FIGS. 6 and 7 are front views, with the housing sectioned, showing other examples of a lens frame holding device according to the invention.
Figure 7:
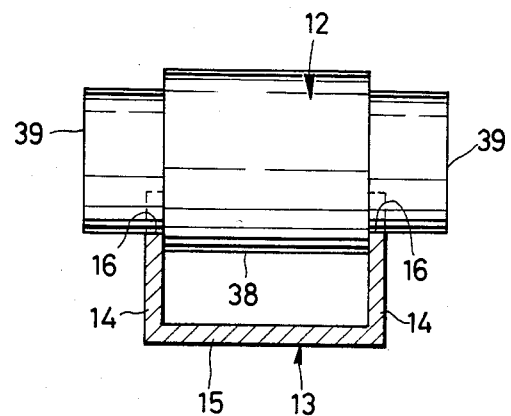

FIGS. 6 and 7 show fourth and fifth examples of the lens frame holding device according to the invention in which provision is made for fixedly determining the position of the lens frame 12 on the housing 13 in the direction of the optical axis. In the fourth example of FIG. 6, an annular groove 36 having a width equal to the thickness of the vertical wall 14 is formed in one end portion of the outer wall of the lens frame 12, while a small diameter part 37, the outside diameter of which is equal to the inside diameter of the annular groove 36, is formed by reducing the diameter to the other end portion of the outer wall of the lens frame 12. Thus, the annular groove 36 and the small diameter part 37 are supported by respective ones of the vertical walls 14. Therefore, the position of the lens frame 12 in the direction of the optical axis is fully determined merely by inserting the vertical wall 14 into the annular groove 36. In the case of FIG. 7, the lens frame 12 includes an enlarged diameter part 38, the length of which is equal to the distance between the vertical walls 14. The enlarged diameter part is inserted between the vertical walls 14. Two smaller diameter parts 39 are formed on both sides of the larger diameter part. In this case also the position of the lens frame 12 on the housing is determined by merely inserting the larger diameter part between the vertical walls.

In the above-described fourth and fifth examples, even if the lens frame 12 is removed from the housing 13, for instance, for maintenance, the lens frame 12 can be set back in the original position accurately merely by inserting the vertical wall 14 into the annular groove 36 in the fourth example and by inserting the larger diameter part 38 between the vertical walls 14 in the fifth example. The arrangement used for fixing the lens frame to the housing is not shown in FIGS. 6 and 7. However, the lens holding members shown in FIGS. 3A through 5C may be used. Thus, in the fourth and fifth examples, the lens frame 12 can be readily fixed and readily positioned with high accuracy.

As is apparent from the above description, in the frame holding device of the invention, the supporting cuts formed in the two vertical walls provided at both ends of the housing and the lens holding members engaged with the hooking slots formed in the vertical walls fixedly hold the lens frame from both sides, and therefore no bending force is applied to the lens frame. Since the lens holding members are elastic, the lens frame holding force is substantially constant. Furthermore, as each lens holding member has a hooking structure for engaging with the hooking slots of the housing, the lens frame can be attached to or detached from the housing without the use of special tools. Thus, the device can be assembled with high efficiency. Also, the lens frame can be fixedly positioned with respect to the housing according to the invention. Therefore, even if the lens frame is removed from the housing, it can be put back in its original position accurately without adjustment. This is another merit of the invention.

I claim:

1. In a lens frame holding device in which a housing has a bottom wall and two vertical walls at both ends of said bottom wall, supporting cuts for supporting a lens frame being formed in said vertical walls opening upwardly, and said lens frame is fixedly secured to said housing by tightening lens holding members, the improvement wherein:
   for each lens holding member, two hooking slots are formed in each vertical wall of said housing,
   each lens holding member is an elastic member having two hooking portions adapted to engage with said two hooking slots, and
   with said lens holding members which are laid over said lens frame set in said supporting cuts formed in said vertical walls, wherein said frame is fixedly secured to said housing by said hooking portion and said hooking slots.

2. The device as claimed in claim 1, in which each of said lens holding members comprises a leaf spring having two grooves cut in opposite end portions thereof which are engaged with respective ones of said hooking slots formed in each vertical walls of said housing.

3. The device as claimed in claim 1, in which each of said lens holding members comprises a tension coil spring having hooks at both ends which are engaged with said hooking slots in each vertical wall of said housing.

4. The device as claimed in claim 1, in which each of said lens holding members comprises a rubber ring, two parts of which are used to engage with said hooking slots in each vertical wall of said housing.

5. The device as claimed in claim 1, in which said lens frame is fixedly positioned with respect to said housing in a direction of an optical axis thereof.

6. The device as claimed in claim 5, in which said lens frame comprises a larger diameter part which is tightly fitted between said two vertical walls of said housing and two smaller diameter parts provided at both ends of said larger diameter part.

7. The device as claimed in claim 5, in which said lens frame has a groove into which one of said vertical walls of said housing is inserted.

* * * * *